Aug. 12, 1958  W. F. GRAHAM  2,847,232
VERTICALLY ADJUSTABLE COUPLING FOR CONNECTING
TRACTORS WITH IMPLEMENTS OR VEHICLES
Filed Sept. 10, 1956  2 Sheets-Sheet 1

INVENTOR.
Wray F. Graham
BY John A. Watson
Att'y.

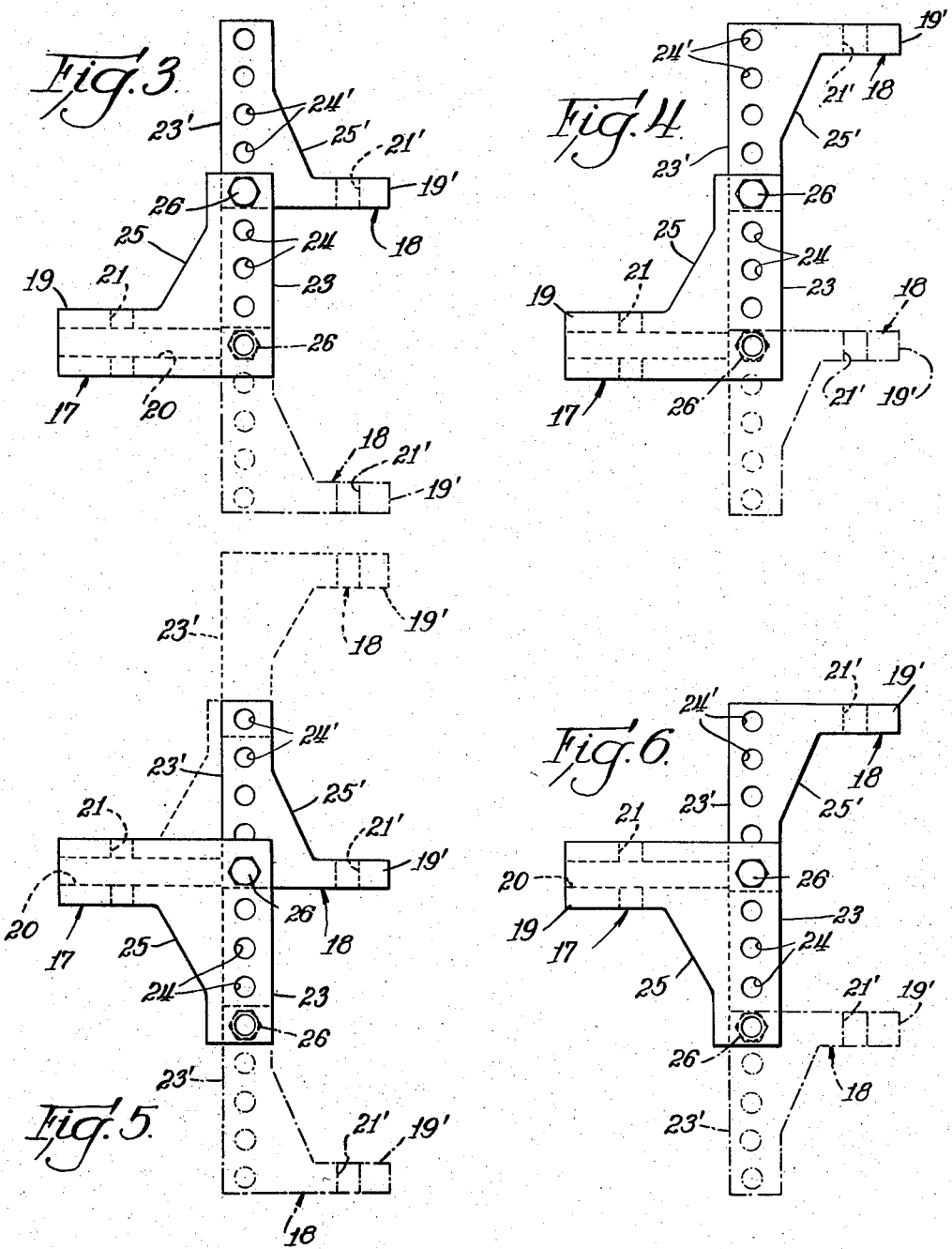

United States Patent Office 2,847,232
Patented Aug. 12, 1958

2,847,232

VERTICALLY ADJUSTABLE COUPLING FOR CONNECTING TRACTORS WITH IMPLEMENTS OR VEHICLES

Wray F. Graham, Aurora, Ill.

Application September 10, 1956, Serial No. 608,979

2 Claims. (Cl. 280—490)

This invention relates to devices particularly useful for coupling farm or similar tractors or other vehicles with another vehicle or farm implement.

One of the principal objects of the invention is to provide a coupling device by which a vehicle such as a tractor may readily, effectively and safely be connected with another vehicle or with a farm implement or the like through the draw-bar of the tractor and the tongue or drawbar of the vehicle or implement to be coupled with the tractor, regardless of the relative levels of the tractor and trailing vehicle or implement drawbars.

Another primary object is to provide a coupling device so arranged that it may readily be employed to couple a tractor to a trailer or implement in such manner that there may be a direct horizontal or "neutral" drawbar pull, that is, a pull without a component of either upward or downward force upon the tractor or trailing vehicle or implement tending to lift or load the tractor rear axle or to load or lift the front end of the trailing vehicle or implement or, so that either a component of upward or of downward force may be imposed upon the tractor or the trailing vehicle or implement through the coupling device, as may be desired.

Many other objectives as well as the advantages and uses of the invention will be or should become apparent after reading the following description and claims and after viewing the presently preferred embodiment of the coupling device as illustrated in the drawings wherein:

Figs. 3, 4, 5 and 6 are somewhat diagrammatic views in side elevation of the two principal coupling device parts or members, as they would appear in each of a number of coupled arrangements.

In essence the coupling device comprises two major parts or members each of which is of L-shape in side aspect and arranged to mate and to be releasably secured to the other in any of a number of relationships of attitude and adjustment, some of which have been illustrated in Figs. 3 to 6 inclusive of the drawings. There it will be observed that in addition to being disposable in a plurality of interrelated attitudes each, through a plurality of registrable openings for the reception of pins or bolts, may be adjusted vertically relative to the other in each attitude to give a comparatively extensive range of adjustment for coupling a tractor with some farm implement. Each member is arranged to be coupled with a drawbar or the like either before or after coupling with the other member.

Figure 1:
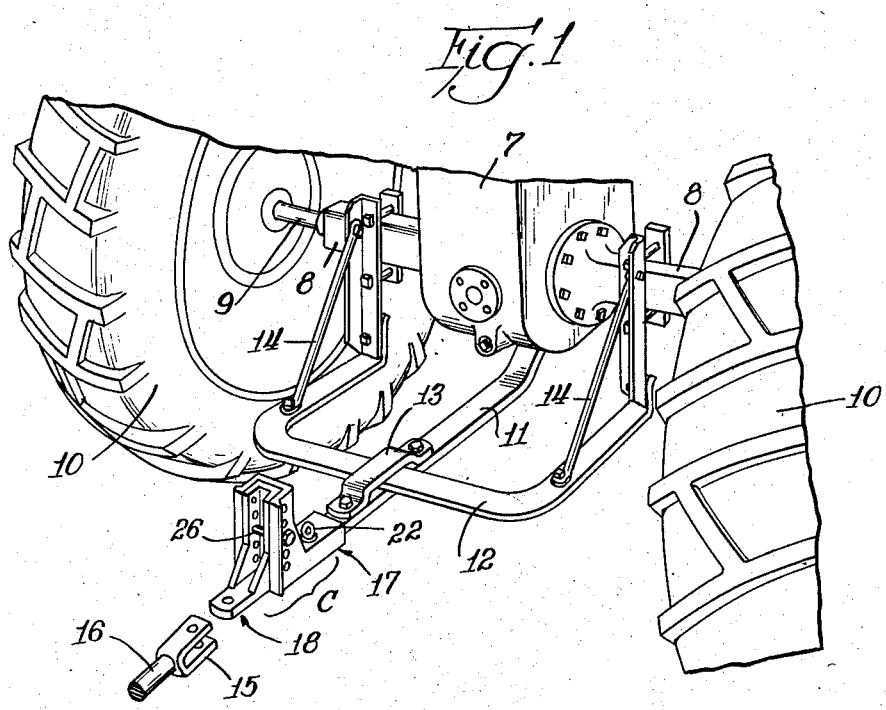
Fig. 1 represents the rear end of a farm tractor with a coupling device embodying the invention connected with the tractor drawbar and ready to be connected with an implement tongue or drawbar.

The tractor parts shown in Fig. 1 include a differential gear case 7, axle housings 8, rear axles (one shown) 9, rubber tired wheels 10, a drawbar 11 suitably pivoted at its forward or inner end upon the gear housing or other structure for horizontal swinging after the usual manner, and a drawbar support bar 12 of U-shape upon which the outer or rear end of the drawbar 11 is supported (for swinging about the pivot at its forward end) by a loop or strap 13 over the bar 12, strap 13 being secured at its ends to the drawbar. The bar 12 may be suitably braced by stays 14. A clevis 15 upon the end of an implement or vehicle tongue or drawbar 16 is also shown in Fig. 1, ready for connection with the coupling device, generally designated C, which previously has been mounted upon and secured to the tractor drawbar 11.

Figure 2:
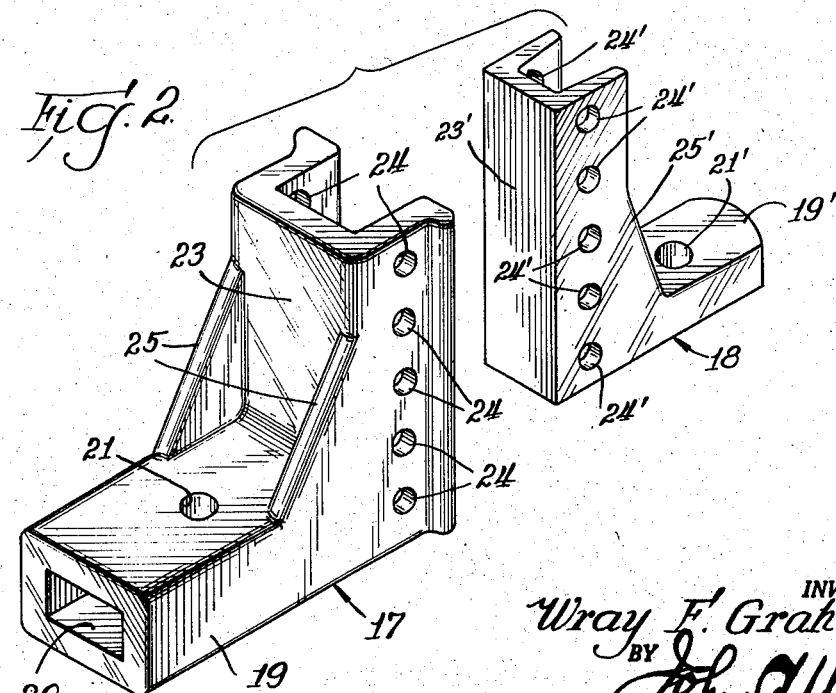
Fig. 2 is a perspective view of the coupling device shown in Fig. 1 with the two principal parts or members thereof separated but aligned for mating engagement.

The two major elements or members 17 and 18 of the coupling device C in its presently preferred form are well illustrated in Fig. 2. Preferably these members are steel castings or forgings but other metal and methods of manufacture may be chosen as will be understood. Member 17 has a tubular leg 19 the dimensions and transverse shape of the hollow interior 20 of which will conform to the dimensions and cross-sectional shape of the end of the tractor drawbar to be received therein with a reasonable degree of clearance. Extending vertically through the leg 19 which will normally be horizontal is a bore 21 for reception of a clevis pin or coupling pin 22 (see Fig. 1) which may be employed to secure the member 17 to the drawbar 11, the drawbar having the usual aperture or opening (not shown) for passage of the pin 22 therethrough.

The vertical leg 23 preferably is of channel or U-shape in transverse section—the channel opening at the back side of the leg—for reception of the corresponding vertical leg 23' of member 18 with which it mates while the channel sides are transversely drilled on horizontal axes at suitably spaced vertical intervals to provide bores, indicated at 24, for the reception of one or more pins or bolts by which the two members 17 and 18 are to be secured together. It will be understood that the bores 24 in opposite sides of the channel of leg 23 will be in horizontal register with one another. Webs 25 may be cast or forged integral with the front of leg 23 and the top of leg 19 thereby to strengthen the member at the leg juncture.

The other coupling member 18 has a normally horizontal leg 19' adapted to be received between the upper and lower arms of clevis 15 or to overlie or underlie the flat end of a drawbar such as that designated 11. In either event a clevis pin or bolt or the like will be inserted through the eyes of the clevis arms or through an opening in the drawbar and a registering bore 21' in arm 19' to effect the coupling connection. The vertical leg 23' of member 18 may also be formed as a channel the back side of the bottom of which will make a fair fit with the inside surface of the bottom of leg 23 of the complementary coupling member 17 and the outer surfaces of the sides of which will make a fair fit with the inside surfaces of the sides of member 17. Webs 25', of which only one is shown but which are similar to webs 25, may be provided to strengthen the member at the leg junction.

It is intended that while the legs 23 and 23' shall nest together they may be nested and taken apart and slid longitudinally relative to one another without difficulty. The vertical leg 23' is transversely drilled as at 24' on horizontal axes at intervals which may correspond with the vertical spacing of the drilled holes 24 in member 17 or the intervals may be different therefrom and at different distances from one another for attainment of various positions of adjustment between the two members. At least one pair of holes 24 in the sides of channel leg 23 of member 17 are to be mated or brought into register with a selected pair (or pairs) of holes 24' in leg 23' of member 18 after which a bolt or pin 26 (see Figs. 1 and 3) will be passed through the registering holes to secure the members in their assembled relationship and to effect the coupling between the tractor and implement or vehicle to be towed.

Thus constructed and arranged the members 17 and 18 of the coupling device may be assembled, one with the other, in any of eight extreme positions or aspects, as illustrated by the full and dash-dot lines of Figs. 3 to 6 inclusive. Of course, the two members may be assembled in a plurality of aspects or relative positions between the two extreme aspects indicated by the full and dash-dot lines of each of Figs. 3 to 6 inclusive, depending upon the number and relative positions of the registrable holes 24—24' in the vertical legs of the members. Therefore, a very considerable coupling range or range of adjustment is available as is represented in Figure 5 by the full, dash-dot and dotted line positions.

It frequently happens that the end of the tongue or drawbar of a vehicle or implement to be towed is located at a level so much above or below the level of the connecting end of the drawbar of the towing vehicle that the two drawbars cannot be directly connected or connected by any of the usual coupling devices without raising one or lowering the other of the drawbars which normally cannot be done without raising or lowering the two machines to be coupled. However when the coupling device herein disclosed is employed, any such difficulty is entirely avoided. On the other hand and as another example, it may be desirable to have the rear or driving wheels of a towing tractor held down by the load of the towed vehicle that is, it may be desirable to place a portion of the load of the towed vehicle upon the tractor drive wheels thereby to gain better traction for such wheels. In such case it may be necessary to raise the tongue or drawbar of the towed vehicle or implement to an elevation substantially above the tractor drawbar position and to couple it to the tractor drawbar at such elevation. For such a purpose the coupling device disclosed herein has proven to be very useful.

While I have illustrated and described what is presently a preferred embodiment of the invention, it will be apparent to those skilled in the art that the invention is susceptible of other forms and embodiments. Consequently I desire to be limited only by the spirit of the invention and the scope of the appended claims.

I claim:

1. A coupling device for effecting connection between two vehicles such as a tractor having a drawbar extending longitudinally rearwardly therefrom and a trailer having a drawbar for connection with the tractor drawbar, comprising a first rigid L-shaped member having a first and second leg disposed substantially normal to each other, said first leg having a pair of channel sides disposed in parallelism and extending longitudinally thereof and outwardly thereof and outwardly therefrom in a direction opposite to said first leg, said second leg having a socket formed therein and communicating with the outer end thereof to receive said tractor drawbar therein, a second rigid L-shaped member comprising a third leg and a fourth leg disposed substantially normal to each other, said third leg having a second pair of channel sides disposed in substantial parallelism and extending longitudinally thereof and disposed therefrom in the same direction as said fourth leg, said third leg being proportioned to fit between said channel sides on said first leg and being slidably movable lengthwise thereof in such fitted relationship, said channel sides on said first leg and said channel sides on said third leg having spaced openings therethrough with corresponding sets of openings positioned in alignment to receive an interconnecting pin therethrough, said fourth leg having means formed thereon for connection with said trailer drawbar, said fourth leg being positioned above said first leg in one pinned position thereof and being positioned below said first leg in another pinned position thereof.

2. A coupling device for effecting connection between two vehicles such as a tractor having a drawbar extending longitudinally rearwardly therefrom and a trailer having a drawbar for connection with tractor drawbar, comprising a first rigid L-shaped member having a first and second leg disposed substantially normal to each other, said first leg having a pair of channel sides disposed in parallelism and extending longitudinally thereof and outwardly therefrom in a direction opposite to said first leg, said second leg having a socket formed therein and communicating with the outer end thereof to receive said tractor drawbar therein, a second rigid L-shaped member comprising a third leg and a fourth leg disposed substantially normal to each other, said third leg being proportioned to fit between said channel sides on said first leg and being slidably movable lengthwise thereof in such fitted relationship, said channel sides on said first leg, and said third leg having spaced openings therethrough with corresponding sets of openings positioned in alignment to receive an interconnecting pin therethrough, said fourth leg having means formed thereon for connection with said trailer drawbar, said fourth leg being positioned above said first leg in one pinned position thereof and being positioned below said first leg in another pinned position thereof.

References Cited in the file of this patent

UNITED STATES PATENTS

| 2,455,195 | Russell | Nov. 30, 1948 |

FOREIGN PATENTS

| 516,514 | Belgium | Jan. 15, 1953 |
| 589,041 | Great Britain | June 10, 1947 |
| 208,668 | Switzerland | May 1, 1940 |